Sept. 24, 1963
G. T. THOMPSON ET AL
3,104,483
PORTABLE FILM VIEWER
Filed Aug. 29, 1960
2 Sheets-Sheet 1
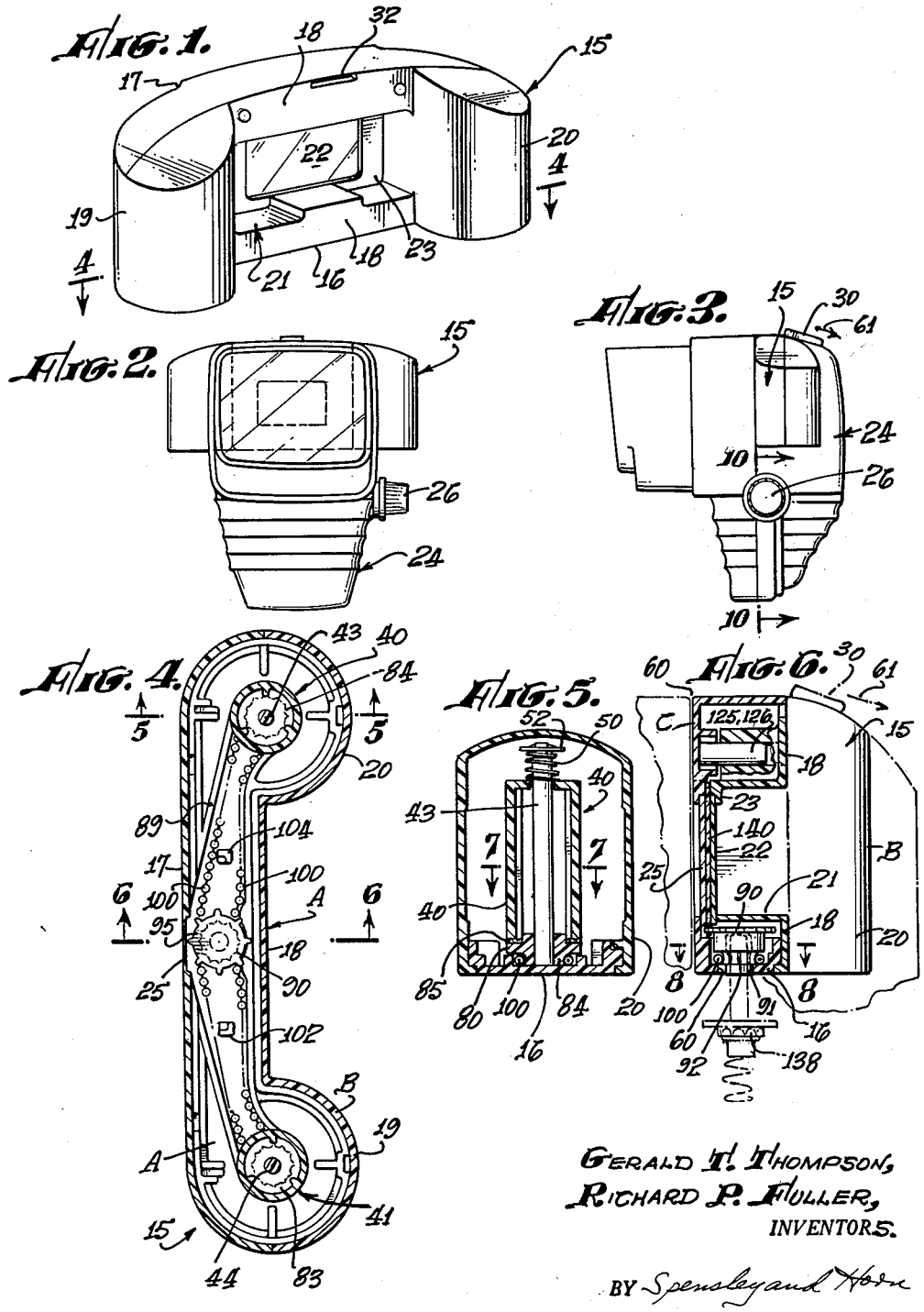
GERALD T. THOMPSON,
RICHARD P. FULLER,
INVENTORS.
BY Spensley and Horn
ATTORNEYS.

Sept. 24, 1963 G. T. THOMPSON ET AL 3,104,483
PORTABLE FILM VIEWER
Filed Aug. 29, 1960 2 Sheets-Sheet 2
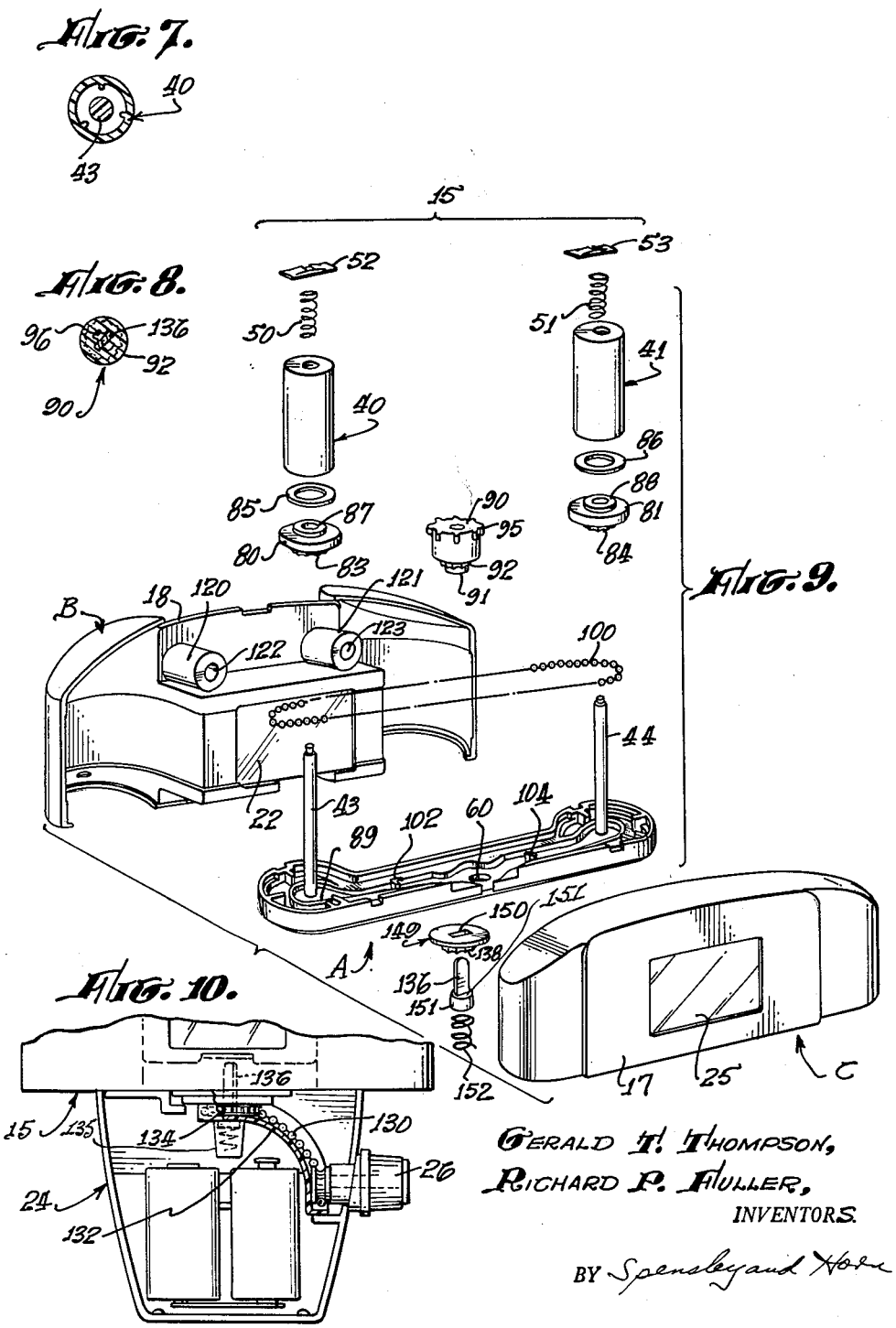
GERALD T. THOMPSON,
RICHARD P. FULLER,
INVENTORS.
BY Spensley and Horn
ATTORNEYS.

United States Patent Office 3,104,483
Patented Sept. 24, 1963

3,104,483
PORTABLE FILM VIEWER
Gerald T. Thompson, Downey, and Richard P. Fuller, North Hollywood, Calif., assignors, by direct and mesne assignments, to The Execugraf Corporation, Los Angeles, Calif., a corporation of California
Filed Aug. 29, 1960, Ser. No. 52,720
2 Claims. (Cl. 40—86)

This invention relates to a portable film viewer and more particularly to a portable viewer of improved design capable of selectively receiving a detachable unitary film strip cartridge.

Portable slide viewers are well known. These prior art portable slide viewers typically receive a single picture mounted as slides, one at a time. When one wishes to view a substantial number of pictures the continuous and repetitious steps of separately loading and unloading the viewer, one slide at a time, becomes laborious. Further, in order to store more than but a few pictures requires a slide tray of substantial size. A tray which carries 100 35 mm. mounted slides, for example, may measure 10″ x 24″ thus rendering it bulky, serving to minimize the portability of the viewer and its associated accessories. While such an arrangement may be acceptable for home use, it appears at once obvious that for many types of commercial use, a more compact solution is required.

The presentation of a plurality of pictures through a portable viewer may be of considerable use in the area of commerical field sales. A film viewer, if truly portable, may be used for entertainment of passengers while traveling on planes, trains or buses, or the like.

A portable slide viewer which eliminates the handling of the film by the user either in strip or slide form also offers obvious advantages.

The present invention device provides a portable film viewer adapted to selectively receive a sealed cartridge containing a film strip. Means are provided in the viewer for driving the film strip past a viewing lens one frame at a time. The entire cartridge is so constructed and arranged as to be readily removable from the viewer proper by release of a simple latch mechanism.

It is therefore a primary object of the present invention to provide a portable film viewer of improved design which permits the viewing of a plurality of pictures individually on a single film strip.

Another object of the present invention is to provide a viewer of the character described which includes a unitary readily detachable film strip cartridge for rapid film subject change.

Yet another object of the present invention is to provide a portable viewer which includes a compact sealed film strip cartridge and a film transport device mechanism for ready engagement with the film in the cartridge.

A further object of the present invention is to provide a completely self-contained sealed film strip cartridge which includes a self-tensioning mechanism whereby the film strip therewithin may be moved selectively in either direction.

Yet another object of the present invention is to provide an automatic coupling means between the transport mechanism contained within the unitary sealed film cartridge and the drive mechanism in the viewer.

A still further object of the present invention is to provide a film strip cartridge which will transport a film strip under substantially equal tension from one reel to another irrespective of the relative amount or ratio of the film which is instantaneously moved about each reel.

Still a further object of the present invention is to provide a film strip cartridge assembled by interlocking parts to form a unitary whole.

In accordance with the presently preferred embodiment of this invention, there is provided a portable film viewer similar in many respects to prior art devices. The viewer, unlike prior art viewers, however, defines a slotted opening toward the top thereof to receive a sealed film strip cartridge. A drive mechanism is provided in the film viewer for coupling with the cartridge when the cartridge is placed within the slot. The cartridge includes a film transport mechanism for ready coupling with the drive mechanism in the viewer. There is further provided a quick release mechanism for selectively securing the cartridge within the slotted opening provided in the film viewer.

The novel features which are believed to be characteristic of the present invention, together with further objects and advantages thereof, will be better understood from the following description in which the invention is illustrated by way of example. It is to be expressly understood, however, that this description is for the purpose of illustration only and that the true spirit and scope of the invention is defined by the accompanying claims.

In the drawings:

FIGURE 1 is a perspective view of a film strip cartridge in accordance with the presently preferred embodiment of this invention;

FIGURE 2 is a front elevation showing the cartridge of FIGURE 1, somewhat reduced in size, mounted in a film viewer;

FIGURE 3 is a side elevation of the viewer of FIGURE 2;

FIGURE 4 is a view taken along line 4—4 of FIGURE 1;

FIGURE 5 is a view taken along line 5—5 of FIGURE 4;

FIGURE 6 is a view taken along line 6—6 of FIGURE 4 further showing a portion of the viewer of FIGURES 2 and 3 in phantom to indicate how the cartridge of FIGURE 1 fits within the viewer;

FIGURE 7 is a view taken along line 7—7 of FIGURE 5;

FIGURE 8 is a view taken along line 8—8 of FIGURE 6;

FIGURE 9 is an exploded detail assembly view of the cartridge of FIGURE 1; and

FIGURE 10 is a view of the drive mechanism taken along line 10—10 of FIGURE 3.

Referring now to the drawings, there is shown in FIGURE 1 is a perspective view of a film strip cartridge 15 in accordance with the presently preferred embodiment of this invention. The cartridge 15 defines a generally flat bottom surface 16 and a generally flat forward wall 17. The forward wall 17 faces the person using the viewer when the cartridge 15 is inserted therewithin. It is shown in FIGURE 1 looking from the rear in order to better present an exposition of its design. A second rear flat wall 18 parallel to wall 17 extends intermediate two generally hollow cylindrical end sections 19 and 20. The rear wall 23 defines a generally centrally located rectangular depression 21. A viewing aperture 22 is provided within depression 21 which aperture has a first polished plastic lens disposed therewithin. The inner wall 23 of the depression 21 is spaced very close to the front wall 17 which also includes an aperture 25. (See FIGURE 9.) The aperture 25 similarly includes a second polished plastic lens which is disposed opposite the first lens.

The entire unitary film strip cartridge is adapted to be selectively received within a slotted opening 60 (see FIGURE 6) defined by the upper portion of the viewer 24 proper. The viewer 24 is shown in FIGURES 2 and 3 with the cartridge 15 inserted therewithin. A film strip disposed and sealed within unitary cartridge 15 may thus be carried within the viewer. The viewer is then ready for instant action. There are no slides to change and no pictures to handle. An extending knob 26 provided in the side wall of the viewer, when rotated by the user, permits him to change pictures silently, easily and rapidly in a manner hereinafter to be explained. A spring loaded latching mechanism 30 is provided in the roof of the viewer 24 in order to lock the cartridge 15 firmly within the viewer and permit its quick removal when desired. The latching mechanism includes a spring loaded member which is secured within a keying slot provided within the roof of the viewer toward the rear thereof. The latch may thus move in the direction of arrow 61. At its extended position, the latch protrudes to a slight extent into the keyway 32 provided near the top of the rear wall of the cartridge. (See FIGURE 1.)

An enlarged sectional view (FIGURE 4) taken along line 4—4 of FIGURE 1 shows much of the inner mechanism of the sealed film strip cartridge. The film strip (not shown) is mounted vertically with the two ends thereof being fastened to the rotatably mounted posts or reels 40 and 41. One means for mounting the film strip to the posts 40 and 41 is by an adhesive plastic tape or the like. The posts 40 and 41 are generally hollow cylindrical members closed at the upper end thereof. The closed end defines a central opening therethrough to receive vertically disposed shafts 43 and 44. The shafts 43 and 44 are fixedly secured to the lower wall 16 of the base of the cartridge 15. The shafts extend upwardly through the openings within the reels 40 and 41. Springs 50 and 51 are secured above the reels upon the shafts by retainers 52 and 53. Thus, posts or reels 40 and 41 are retained in position upon their respective shafts by a constant downward force exerted by the springs 50 and 51. Seated below the posts 40 and 41 are a pair of generally cylindrical members 80 and 81. These members 80 and 81 are generally of the same outside diameter as are the posts 40 and 41 and include or define integral gear sections about a lower extension at 83 and 84. They further have a central opening therethrough to receive the shafts 43 and 44. This may best be seen in FIGURE 9. The gears 83 and 84 have generally smaller outside diameters than the outside diameters of the posts 40 and 41. The geared portions 83 and 84 of the members 80 and 81 are of a predetermined highth.

Within the base A there is provided a chain track. The track is generally defined by a substantially continuous molded vertical wall 89 together with spacers 102 and 104 provided within the wall. The wall 89 generally follows the contour of the outside periphery of the cartridge when viewed from above as in FIGURE 4.

Intermediate the reels 40 and 41 and the members 80 and 81, there are provided spacer rings 85 and 86. Upwardly extending bushing portions 87 and 88 are provided by the members 80 and 81 to prevent the spacers 85 and 86 from slipping off from the upper surface of the members 80 and 81. Thus, a sure clutching action is established between the posts 40 and 41 and the geared members 80 and 81. The spacer rings 85 and 86 are preferably formed of a resilient, high coefficient of friction material such as cork or rubber.

A film engaging sprocket wheel 90 is rotatably secured within a circular hole 60 centrally located through the lower wall 16 of the base A. The wheel 90 includes a lower extension 91 whose outside diameter is substantially equal to the outside diameter of the hole 60. As can be seen in FIGURE 8, a central cross-shaped opening 96 is provided through the length of the wheel 90. Just above the extension 91 there is provided a first gear section 92 whose outside diameter is slightly greater than that of the extension 91. The gear section 92 is located at an elevation which is coplanar with geared portions 83 and 84 of members 80 and 81. A second geared or sprocket portion 95 of a still larger outside diameter is provided above gear portion 92 at about the upper end of wheel 90.

A closed loop chain 100 fits within the track defined by the wall 89 and the spacers 102 and 104. The chain 100 is disposed about the gears 83, 84 and 92. The two vertical separator posts 102 and 104 are provided about opposite sides of the gear 91 in order to insure separation between the elongate sections of the chain 100. Thus, when the wheel 90 is rotated it will cause the chain 100, which meshes with the gears 83 and 84, to drive these gears and therefore the posts 40 and 41 which are in pressure contact with the members 80 and 81.

The channel or cavity defined by the continuous wall 89 together with the spacers 102 and 104 insures that the chain will always remain taut. This serves not only to increase the reliability of the transport mechanism for the film, but also it, together with the post clutch design, generally minimizes any play or backlash that may otherwise exist.

The upper gear or sprocket wheel 95 has its teeth spaced apart a distance commensurate with holes provided in the film strip in order to drive the film from one post or spool to the other.

The film strip cartridge housing, as may best be seen in FIGURE 9, is made up of three self-locking sections to thus define a complete enclosure for the film strip and transport mechanism. The three sections are the base A, forward section B and rear section C. The manner in which these sections lock together can be seen in FIGURES 5 and 6. Two bosses 120 and 121 forming part of section B extend horizontally above the lens 22. These bosses have central holes 122 and 123 therethrough to accommodate similarly placed horizontally extending matable pins 125 and 126 forming part of section C.

The drive mechanism for rotating the transport mechanism included within the cartridge is housed within the viewer 24 as shown in FIGURE 10 and includes a selector knob 26, a chain support 132 with a socket 135 formed as an integral part thereof, a chain 130 and a spring-biased spindle assembly 134. The spindle assembly is supported within the socket 135 and is rotatable with respect thereto. The spindle assembly is spring-biased upwardly and is adapted to be rotated by movement of the chain 130. As shown particularly in FIGURES 9 and 10, the spindle assembly 134 includes a gear member 149 and a shaft 151. The shaft is adapted to be inserted into the socket 135 upon a spring 152 which urges it normally upward. The shaft includes a flattened upper portion 136 and a shoulder portion 151'. When positioned within the socket 135, the shaft is vertically oriented. The gear wheel 149 is horizontally oriented and includes a support section 150 and a gear section 138. A rectangular slot is provided through the gear wheel 149 matable with the flattened portion 136 of the shaft such that the gear wheel is rotatable by rotation of the shaft but the shaft is vertically slidable with respect to the gear wheel. The gear 138 is formed with a series of indentations or serrations matable with the chain 130 and is positioned above the stocket substantially tangential to the upper surface of the chain support 132. The chain support 132 is in turn a 90° arcuate configuration as shown in FIGURE 10. The chain, when rested upon the chain support, is directed from a horizontal line at the upper portion thereof in engagement with the gear 138 to a vertical line at the lower portion thereof in engagement with the selector knob 26.

It can clearly be seen that when the cartridge 15 is placed within the slotted opening in the viewer 24 and locked therein by latch 30, that the spindle shaft will extend upwardly into the opening 96 provided through wheel 90. The head 136 will fit within two opposed ends of the cross-shaped opening. Upon rotation of the knob 26 the chain 130 will rotatably drive the meshing gear 138 which will cause the wheel 134 to turn the wheel 90. This in turn will cause the transport mechanism to advance the film strip 140 (see FIGURE 6) from left to right or vice versa, depending upon the direction of rotation of the knob 26. The film transport mechanism includes the gears 83, 84 and 92 together with gear 95, chain 100 and reels 40 and 41.

There has thus been described a new and improved portable film viewer using a detachable unitary sealed cartridge which houses a film strip. A film strip with as many as 100 pictures of conventional 35 mm. double-frame size may easily be accommodated by the cartridge. The film strip transport mechanism within the cartridge uses the same sprocket wheel to drive the film and the tension reels upon which the film is mounted. Each of the film reels includes in its design an improved clutch arrangement which provides substantially constant film tension on each reel while allowing for a varying amount and ratio of film on each reel. The cartridge housing consisting of three basic parts is of a unique groove-lock design whereby it snaps together when assembled thus insuring that the film strip will be protected. The transport mechanism for the film strip within the cartridge housing includes a chain drive and a track to keep the continuous chain in constant meshing contact with the gears. Additionally, the automatic coupling arrangement between the novel drive mechanism and the transport mechanism is another important feature of the present invention.

What is claimed is:

1. In combination, a portable film viewer and a film strip cartridge, rotatable film transport means in the cartridge, mechanically operable driving means in the viewer for driving the film transport means comprising: a selector knob rotatably mounted upon a wall of said viewer; a spindle assembly spaced from said selector knob, said spindle assembly including a vertically oriented drive shaft for driving said transport means, said drive shaft being spring loaded to an upper engaging position at which it engages said film transport means and being movable against said spring action to a disengaged position, said spindle assembly also including a relatively horizontally disposed gear affixed to said drive shaft, said drive shaft being vertically slidable within said gear; a driving wheel affixed to said selector knob and relatively vertically disposed; a drive chain interconnected between said gear and said driving wheel; and an arcuate chain support member positioned between said driving wheel and said gear, whereby said chain is directed from a substantially horizontal position at said gear to a substantially vertical position at said driving wheel.

2. In combination, a viewer and a removable film strip cartridge, said cartridge comprising a housing having a pair of aligned viewing apertures therein, a pair of reels in opposed relationship in said housing, a film strip on said reels and passing between said viewing apertures, a drive element in said housing, means for connecting said drive element with said reels for rotation thereof and transport of said film strip past said viewing apertures, said drive element comprising coupling means, said viewer including means for releasably retaining said cartridge in assembled relationship therewith, said viewer further including a coupling member cooperatively engaging said coupling means of said cartridge, and means carried by said viewer for driving said coupling member.

References Cited in the file of this patent

UNITED STATES PATENTS

| | | |
|---|---|---|
| 1,176,691 | Ricker | Mar. 21, 1916 |
| 1,430,509 | Jones | Sept. 26, 1922 |
| 1,452,797 | Dudley | Apr. 24, 1923 |
| 1,860,772 | Dorion | May 31, 1932 |
| 1,926,703 | Spence | Sept. 12, 1933 |
| 2,182,084 | Heilwagen | Dec. 5, 1939 |
| 2,246,439 | Hennicke et al. | June 17, 1941 |
| 2,573,543 | Childs | Oct. 30, 1951 |
| 2,840,940 | Miles | July 1, 1958 |

FOREIGN PATENTS

| | | |
|---|---|---|
| 32,493 | Denmark | Oct. 31, 1921 |